United States Patent [19]

Matsuo

[11] 3,776,493

[45] Dec. 4, 1973

[54] PARACHUTE DECOUPLING APPARATUS

[75] Inventor: Jon T. Matsuo, El Centro, Calif.

[73] Assignee: The United States of America as represented by the Secretary of the Navy, Washington, D.C.

[22] Filed: Sept. 11, 1972

[21] Appl. No.: 287,928

[52] U.S. Cl. .............................................. 244/147
[51] Int. Cl. .............................................. B64d 17/62
[58] Field of Search .................. 244/147, 149, 142, 244/152

[56] References Cited
UNITED STATES PATENTS 3,595,501    7/1971    Stencel .............................. 244/142
3,497,168    2/1970    Finney et al. ...................... 249/149

*Primary Examiner*—Duane A. Reger
*Assistant Examiner*—Charles E. Frankfort
*Attorney*—R. S. Sciascia et al.

[57] ABSTRACT

Decoupling apparatus is provided between a parachute and its deployment means, such as a pilot chute, that is actuated automatically and in a positive manner when the parachute has been deployed approximately to a full stretched-out condition prior to inflation.

3 Claims, 5 Drawing Figures

PATENTED DEC 4 1973 3,776,493
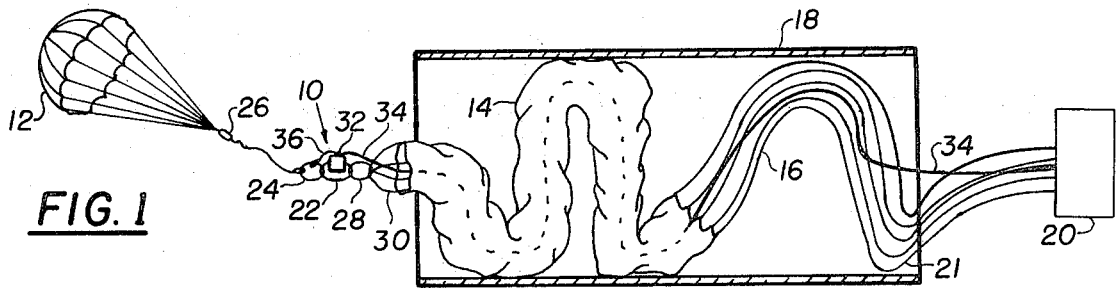
FIG. 1
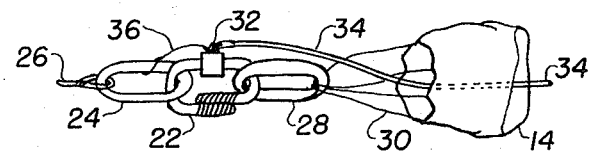
FIG. 2
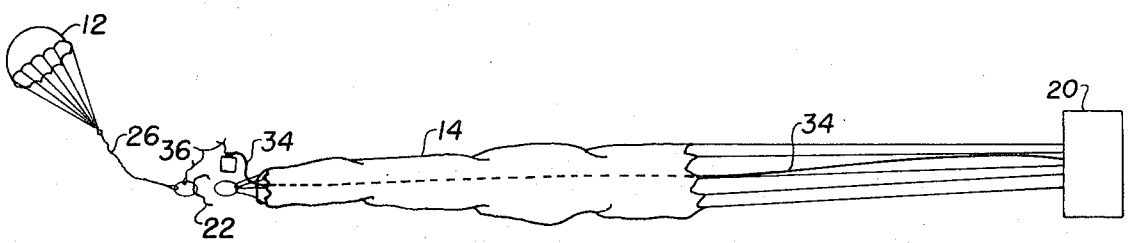
FIG. 3
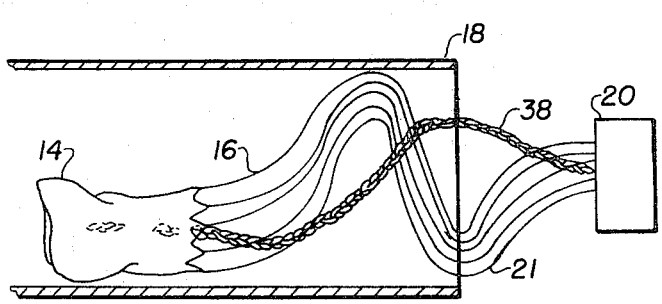
FIG. 4
FIG. 5
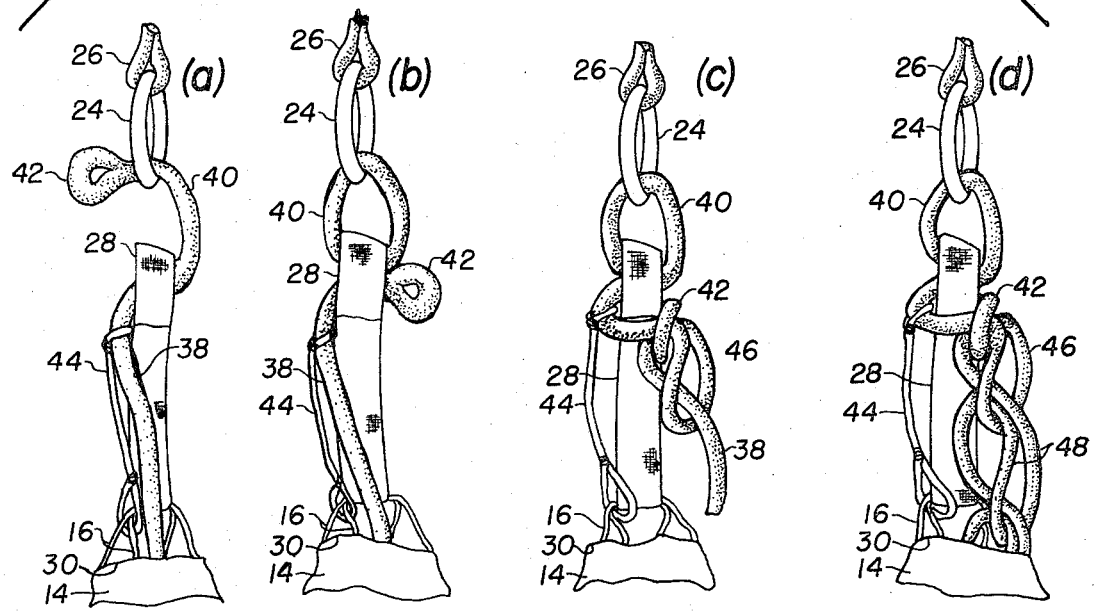

PARACHUTE DECOUPLING APPARATUS

BACKGROUND OF THE INVENTION

This invention relates to deployment of a direct-type of parachute, and more particularly to a decoupling apparatus for such parachute whereby the deployment means is decoupled when the parachute reaches a predetermined orientation in its initially deployed condition.

As a general rule a main or primary parachute is deployed from its stowed condition in one of two ways. In an indirect method, the main parachute is deployed intermediately from a deployment bag which has been ejected by a pilot chute, drogue slug, ballistic mortar or other type of deployment device. In a direct method of deployment the main parachute is deployed directly by such a deployment device without use of a deployment bag. This invention concerns itself primarily with the direct parachute deployment technique.

There are some operational parachute systems in current use that retain the deployment device as an integral part of the main parachute even after full deployment. There are several disadvantages of such a system that are detrimental to the successful operation of the system, and that may cause the following malfunctions, namely: entanglement of the deployment device with the main parachute system; delay in the deployment of the main parachute, particularly at low air speeds; and physical damage to the parachute system.

On the other hand, there are currently in use operational parachute systems that release the deployment device from the main parachute primarily by means of time-delay pyrotechnic cutters. While such time-delay cutters are for the most part reliable, they have a built-in fixed time-delay offering no flexibility in determining the optimum time for jettisoning of the deployment device, particularly important for deployment at low air speeds, and there is the possibility that the pyrotechnic train will not function.

The present invention eliminates the need for a time delay pyrotechnic line cutter and in place substitutes a simple mechanical line cutter that is positively triggered to jettison the deployment device only when the parachute has reached its approximate full stretched-out condition immediately prior to inflation. As an alternative to a mechanical line cutter, a daisy-chain system is offered. In these ways the optimum time for dicarding the deployment device can be readily varied and is achieved automatically independently of any fixed time delay.

SUMMARY OF THE INVENTION

A main parachute is provided with a deployment device that is jettisoned at an optimum time during parachute deployment in a simple and expedient manner. The deployment device, i.e., pilot chute or drogue slug, is connected to the apex of the main parachute via a load carrying member which is capable of being separated, i.e., by cutting when the main parachute attains approximately a full stretched-out condition. This result is achieved by deployment of a release lanyard which extends longitudinally the entire length of the parachute from the load up to the separating means integrally connected in the load carrying member. Before the parachute reaches the full stretched-out condition, the lanyard also assumes a similar condition at which time tension is applied to the lanyard by the load to activate the disconnecting means freeing the deployment device from the main parachute. Thereafter, the main parachute inflates without interference from the jettisoned deployment device.

The release lanyard may be arranged in a daisy-chain configuration to eliminate the need for otherwise accommodating the necessary slack in the lanyard when the main parachute is packed in the stowed position. The load carrying member may be made integral with the upper end of the release lanyard or fabricated as a separate element. The separating means may be a simple mechanical line cutter or a slip knot formed in the free end of the release lanyard.

STATEMENT OF THE OBJECTS OF THE INVENTION

It is one of the principal objects of this invention to provide a simplified release system for jettisoning the deployment device after it has operated to eject a main parachute.

Another important object is to initiate such release in a direct and positive manner, and a corollary object is to activate such separation by a force exerted by the load.

A futher object is to achieve release at an optimum and variable time in the deployment phase without reliance on a time-delay device.

Stil another object is to increase the reliability of the release system.

Other objects, advantages and novel features of the invention will become apparent from the following detailed description of the invention when considered in conjunction with the accompanying drawings.

BRIEF DESCRIPTION OF THE DRAWINGS

FIG. 1 is a side elevation of a containerized main parachute being initially deployed by a pilot chute connected thereto by the novel release system.

FIG. 2 is an enlarged side elevation showing the details of the release system of FIG. 1.

FIG. 3 is a similar view of FIG. 1 after the main parachute has been ejected from its stowed position to a full stretched-out condition at which time the release lanyard has triggered the release of the pilot chute.

FIG. 4 is a partial side elevation view of a stowed main parachute using a modified release lanyard.

FIG. 5 is an enlarged side elevation of a modified release system in which the load carrying loop is formed integral with one end of the release lanyard by means of a daisy-chain knot arrangement, the formation of the loop being shown in four sequential steps.

DESCRIPTION OF THE PREFERRED EMBODIMENT

Referring to the drawings where like reference numerals are used throughout the figures there is shown in FIG. 1 the novel release systems 10 connected between a deployment device, such as a pilot chute 12 and a main parachute canopy 14. It is to be understood that the pilot chute is only representative of such a deployment device as many parachute systems employ a drogue gun slug (not shown), etc. As illustrated in FIG. 1, main parachute canopy 14 and its suspension lines 16 are S-folded by a standard technique in a container 18, which container may be deployed with the main parachute or be constructed integral with an ejection seat, not shown. Suspension lines 16 are connected at their lower ends to any load, being represented for illustrative purposes at 20. A bight 21 is provided in the load end of the suspension lines to provide slack for a purpose later to be described.

The details of release systems 10 are best illustrated in FIG. 2 and comprises a primary load member, such as a loop 22, which may be constructed of any suitable material, but preferably made of the typical reefing line material. Loop 22 is threaded at one end through a link 24, which may be metal, connected to the pilot chute riser strap 26. The other end of loop 22 is threaded through a strap link 28 connected to the exposed upper ends of suspension lines 16 at vented end 30 of the main parachute canopy 14.

In the modification illustrated in FIGS. 1 to 3, primary load loop 22 is provided with any suitable type of separating means, such as a conventional mechanical-type line cutter 32. The severing means when actuated at an appropriate sequence in main parachute deployment will open the loop, disconnecting pilot chute from the main parachute and allowing the former to be jettisoned having served its purpose of ejecting the main parachute.

According to the present invention, the separating means 32 is activated by a release lanyard 34, of any suitable material, which extends longitudinally the length of the parachute, being connected at its lower end to load 20 and at its upper end to the separating means, i.e., line cutter 32, passing through the vented apex 30. Release lanyard 34 is packed with suspension lines 16 in a serpentine configuration. The lanyard is fabricated to a desired length, preferably 5 to 10 percent shorter than the full stretched-out parachute length in FIG. 3. The line cutter 32 may be temporarily secured in an inactive condition by a safety tie line 36 anchored to link 24 and to line cutter 32. Tie line 36 prevents line cutter 32 from being triggered by the shock and vibration forces developed by the operation of the deployment device that might otherwise cause premature jettisoning thereof before it has fully ejected the main parachute.

As main parachute 14 is withdrawn from its container 18 by pilot chute 12, the main parachute gradually assumes an elongated position, as shown in FIG. 3. Before the main parachute reaches its full, stretched-out condition the force is transferred to the shorter-length release lanyard 34 which is pulled taut, and the tension exerted by the load triggers line cutter 32, overriding by breaking safety tie line 36. The activated line cutter functions to sever loop 22, freeing pilot chute 12 and associated appendages to be jettisoned away from the inflating main parachute.

A modified release lanyard 38 is illustrated in FIG. 4 fabricated with a series of slip knots in a daisy-chain configuration in a manner well-known in the parachute art. For this use it is preferred that the lanyard be fabricated of a nylon woven line to insure ease in unraveling. It should be noted that bight 21 provided in the unchained lanyard 34 of FIG. 1 is not needed in the chained version of FIG. 4 because the daisy-chained lanyard 38 is approximately 75 percent shorter in length than unchained lanyard 34. During deployment of main parachute 14, the daisy-chained lanyard 38 commences to unravel from the load end, making premature release practically impossible because lanyard 38 must completely unchain itself before the line cutter can be positively actuated.

Instead of fabricating primary load loop 22 in FIGS. 1 and 2 as a separate element 22, the loop can be made integral with the upper end of either unchained release lanyard 34 of FIG. 1 or chained release lanyard 38 of FIG. 4.

FIG. 5 shows how a modified primary load loop 40 is formed by steps (a) through (d) in an integral end of either lanyard 34 or 38, using, for example, a daisy-chain type of slip knot although other types of slip knots could be employed. In step (a) of FIG. 5, a free end of lanyard 38 terminating in an eye 42 is first threaded through strap link 28 and then through link 24. As best shown in FIG. 5(a), the free end of lanyard 38 may be anchored to the upper end of main parachute 14 by a tether line 44 to prevent the lanyard from flailing about uncontrolled after the lanyard has unraveled to release pilot chute 12. As shown, tether line 44 is conveniently knotted to lanyard 38 at a point spaced from eye 42, and to the upper ends of suspension lines 16.

In step (b) of FIG. 5, the looped end of 42 of the lanyard is threaded back through link 28 to complete load loop 40. In step (c), an intermediate bight portion 46 of the lanyard is formed and threaded through eye 42 to form the first daisy-chain knot. In step (d), a second bight portion 48 of the lanyard is formed and threaded through bight 46 to form the second daisy-chain knot. The daisy-chain configuration can be continuously formed in the remaining, or any portion, or the entire length of the lanyard as illustrated in FIG. 4 and suitably secured such as by a break-tie at the load. As is well-known in the art, such daisy-chain knots are made loosely, and not snubbed tightly, to assure the sequential release of each knot as the daisy-chained lanyard begins to unravel from the load end upwardly as tension is applied by the gradual deployment of the main parachute. As is obvious, the daisy-chain knots unravel in the reverse manner from their formation, namely, from step (d) to step (a) at which time pilot chute and appendage is free to be jettisoned.

Although the use of a daisy-chained lanyard offers the above-described additional advantages, the unchained lanyard 34 of FIG. 1 and a line cutter or equivalent means equally can be employed to initiate separation of the load loop in a manner similar to that described with respect to FIG. 1.

The present invention provides a simple and expedient technique for jettisoning a deployment device after it has served the purpose of ejecting the main parachute to a full stretched-out orientation. Such decoupling action is assured at an optimum time in the deployment phase of the main parachute and in a positive manner by the release lanyard. The release time can be varied by changing the length of the release lanyard without reliance on a time-delay powder train used in pyrotechnic line cutters. Simplifying the release system through the present invention enhances its reliability. The primary load loop connecting the deployment device to the main parachute may be formed as a separate loop or made integral with the end of the lanyard which can be chained or unchained.

Obviously many modifications and variations of the present invention are possible in the light of the above teachings. It is therefore to be understood that within the scope of the appended claims the invention may be practiced otherwise than as specifically described.

What is claimed is:

1. Apparatus for decoupling a deployment device from a parachute comprising:
   a parachute canopy including suspension lines connected to a load;
   a deployment member for ejecting said parachute from its housing;
   at least one load carrying member connecting said deployment member to an apex of said parachute;
   means for separating said load carrying member;
   a continuous lanyard longitudinally extending directly between the load and the apex for actuating said separating means when the suspension lines are approximately in a fully extended position whereby the deployment member can be jettisoned to prevent interference with subsequent parachute;
   a portion of said lanyard is knotted in a daisy-chain capable of gradually unraveling from the load end toward the apex end of the parachute as the parachute elongates from its stowed condition;
   said lanyard being slightly shorter in length than the fully extended length of the combined canopy and suspension lines so that the separating means is actuated when the canopy is approximately at its full-stretched condition.

2. Apparatus for decoupling a deployment device from a parachute comprising:
   a parachute canopy including suspension lines connected to a load;
   a deployment member for ejecting said parachute from its housing;
   at least one load carrying member connecting said deployment member to an apex of said parachute;
   means for separating said load carrying member;
   a continuous lanyard longitudinally extending directly between the load and the apex for actuating said separating means when the suspension lines are approximately in a fully extended position whereby the deployment member can be jettisoned to prevent interference with subsequent parachute;
   said load carrying member being a loop and integrally a portion of said lanyard;
   said lanyard being slightly shorter in length than the fully extended length of the combined canopy and suspension lines so that the separating means is actuated when the canopy is approximately at its full-stretched condition.

3. The apparatus of claim 2 wherein said loop is formed as an integral end portion of a daisy-chained lanyard.

* * * * *